US011908446B1

(12) United States Patent
Yong

(10) Patent No.: US 11,908,446 B1
(45) Date of Patent: Feb. 20, 2024

(54) WEARABLE AUDIOVISUAL TRANSLATION SYSTEM

(71) Applicant: Eunice Jia Min Yong, Austin, TX (US)

(72) Inventor: Eunice Jia Min Yong, Austin, TX (US)

( * ) Notice: Subject to any disclaimer, the term of this patent is extended or adjusted under 35 U.S.C. 154(b) by 0 days.

(21) Appl. No.: 18/481,801

(22) Filed: Oct. 5, 2023

(51) Int. Cl.
*G10L 13/02* (2013.01)
*H04N 7/18* (2006.01)

(52) U.S. Cl.
CPC .............. *G10L 13/02* (2013.01); *H04N 7/183* (2013.01)

(58) Field of Classification Search
CPC ....... G02B 27/017; G06F 1/163; G06F 3/017; G06F 3/02; G06F 3/0346; G06F 8/31; G06F 40/295; G06F 40/56; G06F 40/58; G06F 40/40; G06V 30/414; G08B 1/08; G08B 25/008; G09B 19/06; G09G 1/007; G10L 13/00; G10L 13/02; G10L 13/033; G10L 15/02; H04M 3/42; H04M 3/42229; H04N 5/222; H04N 7/181; H04N 7/183; H04N 21/41407; H04N 21/4394; H04N 21/8126; H04N 7/77; H04N 21/414; H04N 21/4884; H04R 1/028; H04R 1/105; H04R 29/001; H04L 5/0073; H04L 67/561; H04W 76/38
See application file for complete search history.

(56) References Cited

U.S. PATENT DOCUMENTS

| 5,145,376 A * | 9/1992 | Krass .................... G09B 19/06 434/157 |
| 8,593,570 B2 * | 11/2013 | Boland ................... H04N 5/77 455/575.2 |
| 8,825,468 B2 * | 9/2014 | Jacobsen ................ G06F 40/58 351/158 |
| 10,827,024 B1 * | 11/2020 | Schissel .................... G06F 8/31 |
| 10,853,589 B2 * | 12/2020 | Osterhout ............... G06F 40/58 |
| 11,442,534 B1 * | 9/2022 | Douglas ................ G06F 3/0346 |
| 11,540,054 B2 * | 12/2022 | Shmukler ................. G06F 3/16 |
| 11,545,134 B1 * | 1/2023 | Federico ............... G10L 13/033 |
| 11,727,223 B2 * | 8/2023 | Osterhout ............... G06F 40/58 359/630 |
| 11,736,775 B1 * | 8/2023 | Balest ................ H04N 21/4394 725/32 |
| 2003/0065504 A1 * | 4/2003 | Kraemer ................ G06F 40/58 704/8 |
| 2005/0149335 A1 * | 7/2005 | Mesbah .................. H04M 3/42 704/277 |

(Continued)

*Primary Examiner* — Gerald Gauthier

(57) ABSTRACT

The wearable audio-visual translation system is a device that includes a wearable camera and audio system, that can take photos of a signboard using a wearable camera, send the images wirelessly to the user's smart phone for translation, and send the translation back to the user in the form of an audio signal in very less time. To accomplish this, the device is mounted on to eyewear, such that the camera system can capture visual signs instantaneously as the user is looking at them. Further, the device comprises associated electrical and electronic circuitry mounted onto the same eyewear that enables streaming of the photos taken by the camera system into a wirelessly connected smartphone. The smartphone performs image processing and recognition on the images with the help of a translator software application, and the translated signs are synthesized to audio signals and played out in an audio device.

14 Claims, 8 Drawing Sheets

(56) References Cited

U.S. PATENT DOCUMENTS

| | | | |
|---|---|---|---|
| 2006/0136226 A1* | 6/2006 | Emam | H04N 5/222 348/E5.022 |
| 2008/0231950 A1* | 9/2008 | Lvovsky | 359/436 |
| 2008/0233997 A1* | 9/2008 | Okayasu | H04W 76/38 455/550.1 |
| 2008/0243473 A1* | 10/2008 | Boyd | G06F 40/58 704/2 |
| 2009/0070096 A1* | 3/2009 | Ye | G06F 40/58 704/2 |
| 2011/0274311 A1* | 11/2011 | Lee | G10L 13/00 381/74 |
| 2013/0242262 A1* | 9/2013 | Lewis | H04L 5/0073 351/209 |
| 2013/0293577 A1* | 11/2013 | Perez | G02B 27/017 345/633 |
| 2014/0297256 A1* | 10/2014 | Rogowski | G06V 30/414 704/2 |
| 2015/0002676 A1* | 1/2015 | Yoo | H04N 7/181 348/159 |
| 2015/0142416 A1* | 5/2015 | Lee | G06F 40/58 704/2 |
| 2016/0275076 A1* | 9/2016 | Ishikawa | G06F 40/58 |
| 2016/0283469 A1* | 9/2016 | Gold | H04R 29/001 |
| 2016/0328391 A1* | 11/2016 | Choi | G06F 40/58 |
| 2017/0060850 A1* | 3/2017 | Lewis | G06F 40/58 |
| 2017/0083504 A1* | 3/2017 | Huang | G06F 40/40 |
| 2017/0103748 A1* | 4/2017 | Weissberg | G10L 15/02 |
| 2017/0186465 A1* | 6/2017 | Walters | H04N 21/41407 |
| 2017/0364509 A1* | 12/2017 | Cordell | H04L 67/561 |
| 2018/0075659 A1* | 3/2018 | Browy | G06F 1/163 |
| 2018/0247498 A1* | 8/2018 | Friar | G08B 1/08 |
| 2019/0005942 A1* | 1/2019 | Ma | G08B 25/008 |
| 2019/0028772 A1* | 1/2019 | Perez | H04N 21/4884 |
| 2019/0220521 A1* | 7/2019 | Uchida | H04M 3/42229 |
| 2019/0311640 A1* | 10/2019 | Merwin | G09B 19/06 |
| 2020/0012352 A1* | 1/2020 | Yang | G06F 3/02 |
| 2020/0042602 A1* | 2/2020 | Anderson | G06F 40/56 |
| 2020/0380959 A1* | 12/2020 | Chen | H04R 5/033 |
| 2021/0157844 A1* | 5/2021 | Andon | G06F 3/017 |
| 2021/0168492 A1* | 6/2021 | Kim | H04R 17/02 |
| 2021/0264931 A1* | 8/2021 | Leider | G10L 21/0264 |
| 2021/0279428 A1* | 9/2021 | Foster | H04R 1/105 |
| 2021/0297751 A1* | 9/2021 | VanSickel | H04N 21/8126 |
| 2021/0373834 A1* | 12/2021 | Goldberg | G09G 1/007 |
| 2022/0245489 A1* | 8/2022 | Rodriguez | G06F 40/295 |
| 2022/0358701 A1* | 11/2022 | Brandon | G10L 25/63 |
| 2023/0260534 A1* | 8/2023 | Escudero | H04R 1/028 704/3 |

\* cited by examiner

WEARABLE AUDIOVISUAL TRANSLATION SYSTEM

FIELD OF THE INVENTION

The present invention generally relates to a wearable audiovisual translation system. More specifically, the present invention is a wearable apparatus for translating visual signs to audio signals.

BACKGROUND OF THE INVENTION

Normally, if a user is traveling to a foreign country, it is difficult to understand signboards in a different language. A visual translator allows the user to translate textual information in the field of view of the user from and to a variety of languages. However, when it comes to signs and hand signals on sign boards, typically, the user has to scan the signboard with their phone, and the phone will send back the translation. This can be challenging as the user has to continuously point the camera at the signboard. In other words, this is often a tedious task when the user is in a foreign country and may require translation at a faster rate or more frequently. Thus, it would also be helpful if the user could listen to a translation in the user's preferred language instantaneously after observing an unknown new symbol. Currently, there are many applications that enable users to translate different languages and symbols. However, an audio-visual translation device that is quick in giving an audio translation of a visual signal, as well as a device that is wearable on the user for easier scanning and detection of sign boards or new hand symbols is a rare find in the current market.

An objective of the present invention is to provide users with a visual to audio translation system that can be attached to any accessory that the user is wearing. More specifically, the present invention is a wearable camera and audio system that communicates with a smart phone via wireless communication methods. Accordingly, the present invention is a wearable camera and audio system that can take photos of a signboard using the wearable camera, send images wirelessly to the user's smart phone for translation, and send the translation back to the user in the form of an audio signal.

SUMMARY

The present invention is intended to provide users with a visual to audio translation system that can be attached to any accessory that the user is wearing. More specifically, the present invention is a wearable camera and audio system that can take photos of a signboard using the wearable camera, send the images wirelessly to the user's smart phone for translation, and send the translation back to the user in the form of an audio signal in very less time. To accomplish this, the present invention is mounted on to eyewear, such that a camera system attached to the bridge of the eyewear can capture visual signs instantaneously, as the user is looking at them. Further, the present invention comprises associated electrical and electronic circuitry mounted onto the same eyewear that enables streaming of the photos taken by the camera system into a wirelessly connected smartphone. The smartphone performs image processing and recognition on the images with the help of a translator software application. Furthermore, the translated signs are synthesized to speech/audio signals and played out in an audio device that is connected to the smart phone.

DETAIL DESCRIPTIONS OF THE INVENTION

Figure 1:
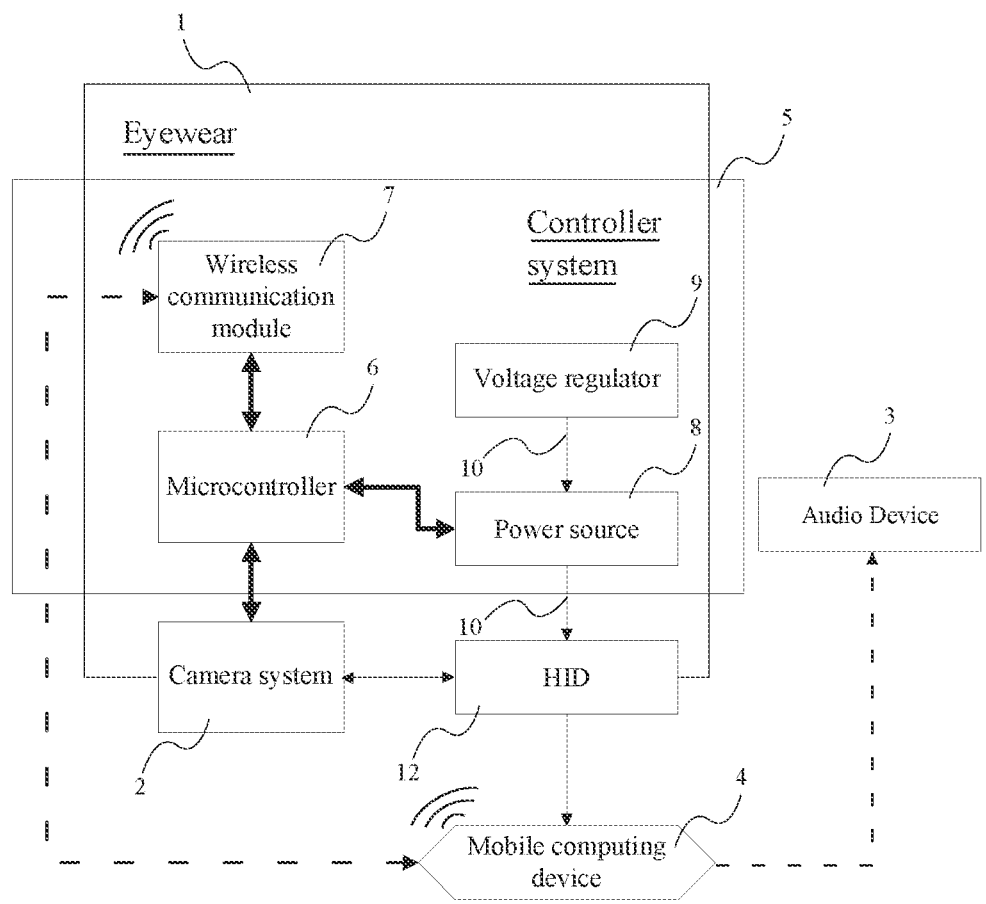
FIG. 1 is a block diagram of the present invention, wherein thinner flowlines represent electrical connections between components, thicker flowlines represent electronic connections between components, and dashed flow lines indicate the components being communicably coupled.
Figure 2:
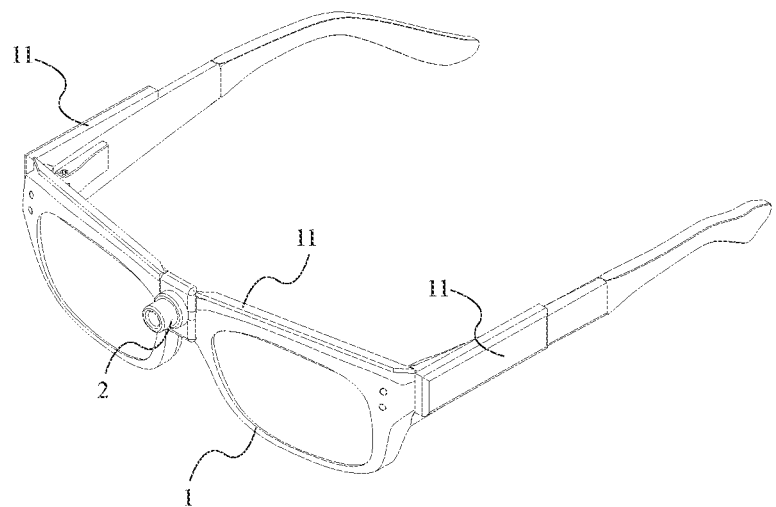
FIG. 2 is a top front left perspective view of the present invention.
Figure 3:
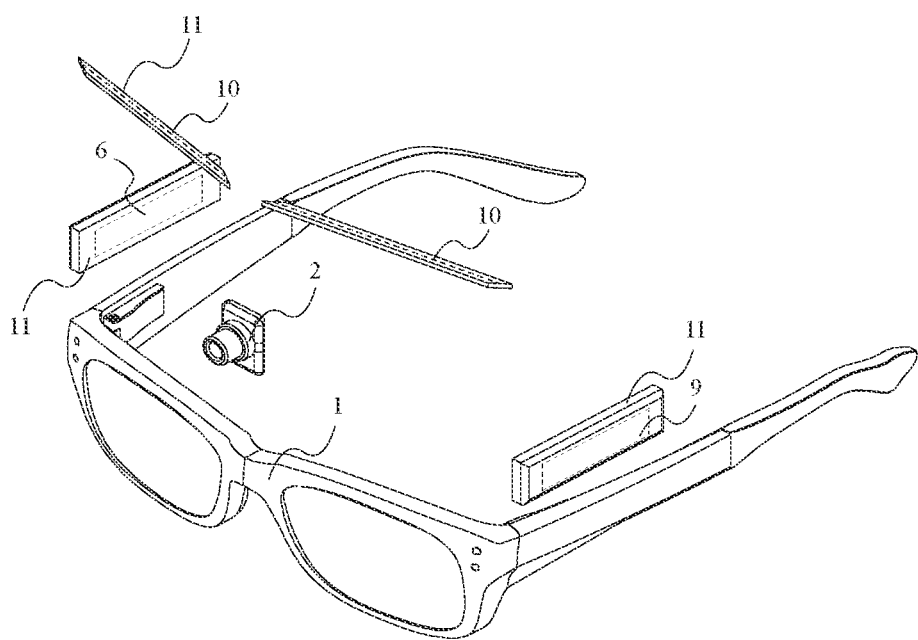
FIG. 3 is an exploded top front left perspective view of the present invention.
Figure 4:
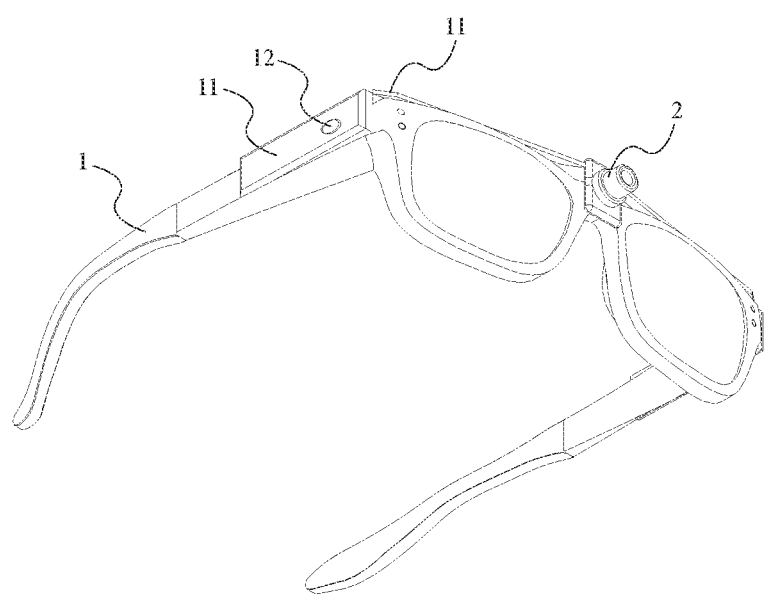
FIG. 4 is a bottom front right perspective view of the present invention.
Figure 5:
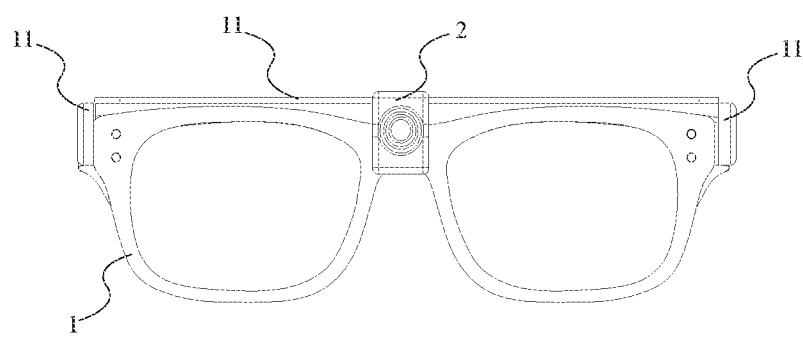
FIG. 5 is a front elevational view of the present invention.
Figure 6:
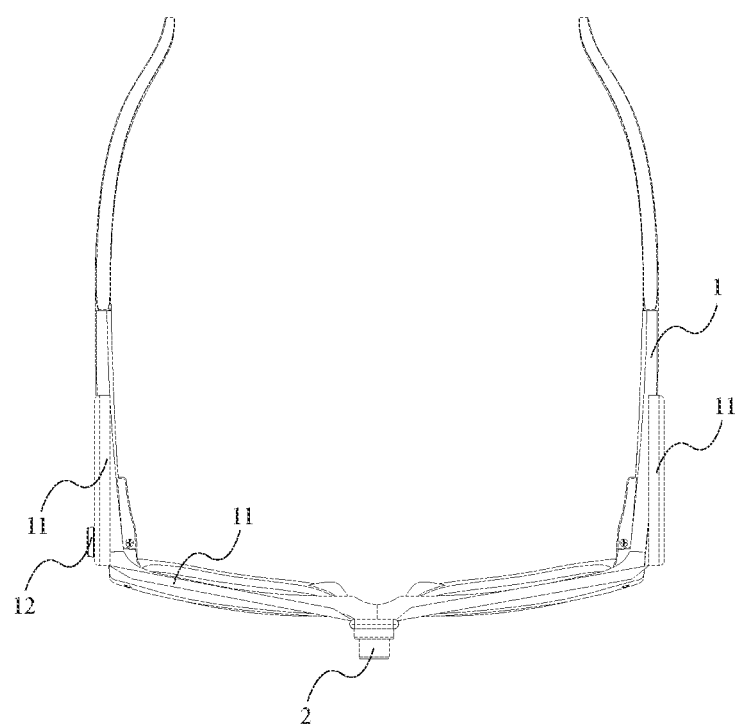
FIG. 6 is a top plan view of the present invention.

All illustrations of the drawings are for the purpose of describing selected versions of the present invention and are not intended to limit the scope of the present invention.

The following description is in reference to FIG. 1 through FIG. 8.

In reference to FIG. 1 through FIG. 6, the present is a wearable camera and audio system that can take photos of a signboard using a wearable camera, send the images wirelessly to the user's smart phone for translation, and send the translation back to the user in the form of an audio signal in very less time. To accomplish the above-mentioned functionalities, the present invention comprises an eyewear 1, a camera system 2, an audio device 3, a mobile computing device 4, and a controller system 5. Preferably, the eyewear 1 is any framed eyeglasses, such as sunglasses, prescription glasses, etc. Preferably, the camera system 2 is a mini or compact camera module that can be attached to the eyewear 1 without compromising the vision of the user. However, the eyewear 1 and the camera system 2 may comprise any size, shape, components, arrangement of components, brand, etc. that is known to one of ordinary skill in the art, as long as the intents of the present invention are not altered. In the preferred embodiment, the camera system 2 and the controller system 5 are mounted onto the eyewear 1, wherein the camera system 2 is electronically coupled to the controller system 5. The controller system 5 is an electrical and electronic system that enables the functionalities of the present invention. To that end, the controller system 5 is communicably coupled to the mobile computing device 4. In the preferred embodiment of the present invention, the mobile computing device 4 is a smart phone or a tablet that functions as the remote computing device that executes the functioning of the present invention. It should be noted that the mobile computing device 4 may comprise any size, shape, brand, version, technology, etc. that are known to one of ordinary skill in the art, as long as the intents of the present invention are not altered. Further, the camera system 2 is operably coupled to the mobile computing device 4 through the controller system 5, wherein visual signals captured by the camera system 2 are transmitted to the mobile computing device 4 through the controller system 5. The mobile computing device 4 performs image processing and recognition on the images with the help of a translator software application installed in the mobile computing device 4. Furthermore, the audio device 3 and the camera system 2 are communicably coupled through the mobile computing device 4, wherein visual signals captured by the camera system 2 are translated into audio signals by the mobile computing system 4 and the audio signals are output through the audio device 3. To accomplish this, the audio device 3 may be wirelessly connected to the mobile computing device 4 through a low-energy connection such as Bluetooth connection. In the preferred embodiment, the visual signals comprise at least one of hand signs, road signs, labels, and public displays. However, the visual signals may comprise any other signs or symbols that pertain valid to the translator software application. Similarly, the audio device 3 comprises at least one of, ear-pods, headphones, and speakers. Preferably, the audio device 3 comprise ear-pods. However, the audio device 3 may comprise any audio emitting device that may be connected to the mobile computing device 4 and may be known to a person of ordinary skill in the art, as long as the objectives of the present invention are not altered.

A more detailed description of the present invention follows.

According to the preferred embodiment, and as seen in FIG. 1, the controller system 5 comprises a microcontroller 6, a wireless communication module 7, and a power source 8. The microcontroller 6 is a processing device that interprets commands received from the mobile computing device 4 and uses these commands to manage the operation of the electrical components within the present invention. The power source 8 is a rechargeable battery, that is used to deliver electrical power to the microcontroller 6, and the camera system 2. However, any other source of power, or a combination of various sources of power (such as solar power) may be employed for the smooth functioning of the present invention. To enable the smooth functioning of the present invention, the microcontroller 6 is electrically connected to the power source 8, and the wireless communication module 7 is electronically coupled to the microcontroller 6. The wireless communication module 7 is a wireless radio that connects and communicates with external devices via wireless data transmission protocols. The wireless communication module 7 is capable of using standards including, but not limited to, Bluetooth, WI-FI, GSM, CDMA, and ZigBee. Accordingly, the wireless communication module 7 is communicably coupled to the mobile computing device 4.

Continuing with the preferred embodiment, the controller system 5 comprises a voltage regulator 9, and a plurality of wires 10. The voltage regulator 9 helps with controlling and regulating the amount of electrical power that goes into the camera system 2 and other components of the present invention. To that end, the voltage regulator 9 is electrically connected to the power source 8 and the voltage regulator 9 is electronically connected to the microcontroller 6. Further, the plurality of wires 10 is electrically connected between the microcontroller 6, the power source 8, and the voltage regulator 9, wherein the plurality of wires 10 helps with transferring electrical power to the various components of the present invention.

In order to protect the electric and electronic components from external elements in a safe manner, and for concealing the components in an aesthetically pleasing manner, the present invention comprises at least one housing unit 11. As seen in FIG. 2 through FIG. 6, the housing unit 11 is laterally mounted onto the eyewear 1. Further, the camera system 2 is laterally integrated onto the housing unit 11, and the controller system 5 is mounted within the housing unit 11 in a concealed and protective fashion. In reference to FIG. 2, and FIG. 4 through FIG. 6, the housing unit 11 is mounted onto the bridge of the eyewear 1, and the housing unit 11 is mounted onto the legs of the eyewear 1 adjacent to a temple region.

In order to actuate capturing of visual signals by the camera system, the present invention comprises a human interface device (HID) 12. Preferably, the HID 12 comprises one or more push button switches. However, the HID 12 may comprise any other technology, such as voice activation, touch pad, sensors, etc. that can actuate photo capture. To that end, the HID 12 is electronically connected to the controller system 5 and mounted adjacent to the controller system 5 on the eyewear 1. Further, the HID 12 is operably coupled onto the camera system 2, wherein operating the HID 12 initiates the camera device 2 to capture and transmit at least one image to the mobile computing device 4 through the controller system 5.

In the preferred embodiment, the user can press the HID 12 on the eyewear 1 to begin sending images to the phone at a high frame rate (15 fps-frames per second). In this case, the images may be compressed to save space. Alternatively, the camera system 2 can send a continuous stream of images at a lower frame rate (2 fps). In other words, the camera system 2 continuously captures and streams images into the mobile computing device 4 at a predefined rate.

Figure 7:
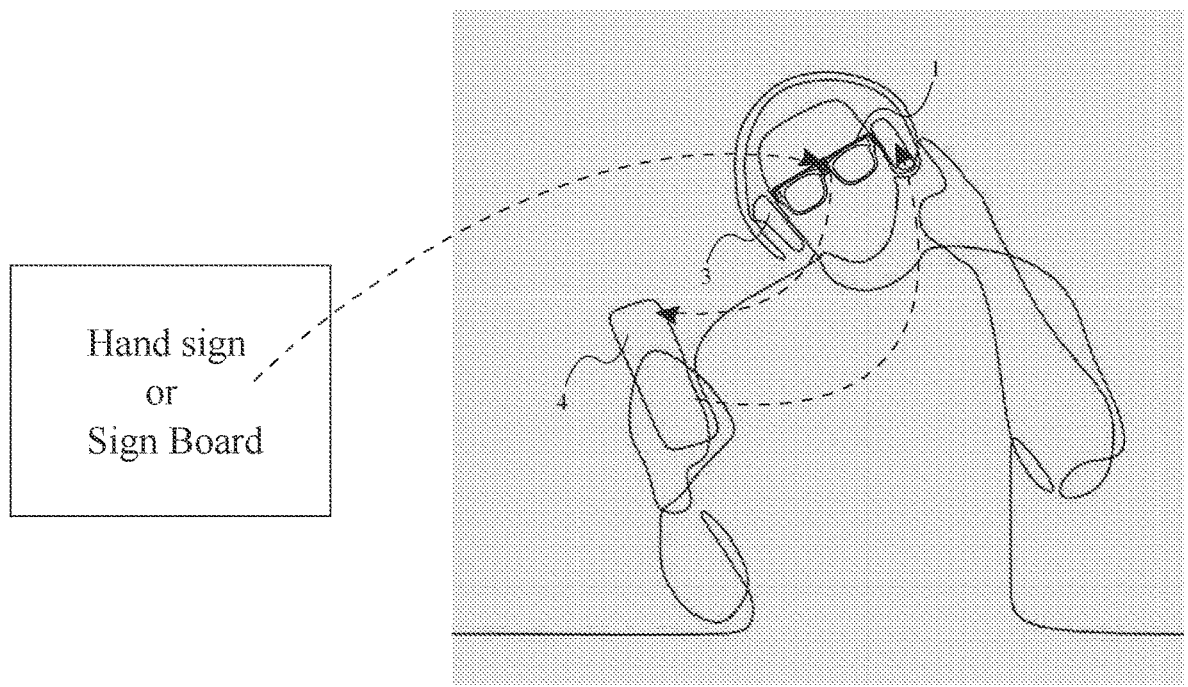
FIG. 7 is a schematic representation of the present invention in use.
Figure 8:
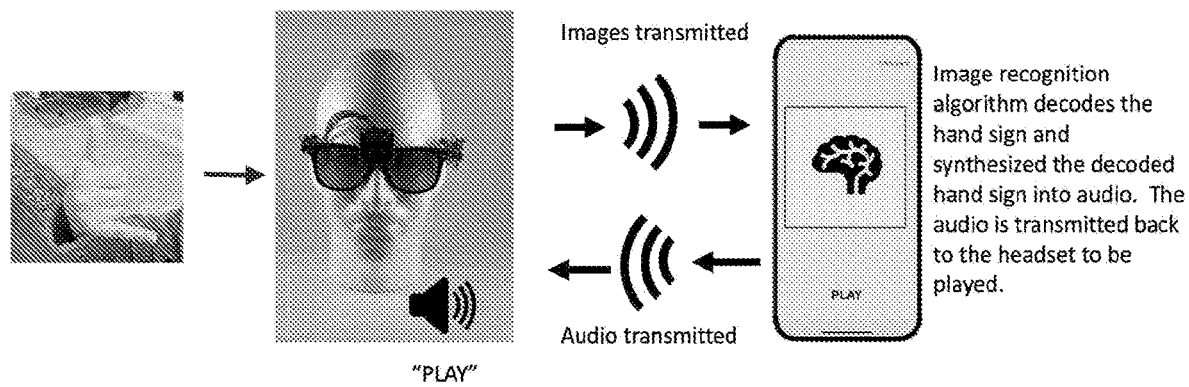
FIG. 8 is a schematic representation of the operation of the present invention.

In reference to FIG. 7 and FIG. 8, a flow of operation of the present invention is represented. The user captures the image of the hand sign or sign board through the camera system 2 on the eyewear 1. The image is sent to the smart phone wirelessly through the controller system 5 and the image is processed by the image recognition and translation software installed on the smart phone. The audio signal of the translated image is wirelessly sent to the audio device 3 connected to the smart phone or mobile computing device 4 and the user listens to the audio signal instantaneously.

In an alternate embodiment of the present invention, the camera system 2 and the controller system 5 are detachably mounted onto the eyewear 1. In such an embodiment, the user can wear normal eyewear, goggles, or sunglasses, and the camera system 2 and the controller system 5 may be attached to the respective eyewear only when needed.

Although the invention has been explained in relation to its preferred embodiment, it is to be understood that many other possible modifications and variations can be made without departing from the spirit and scope of the invention as hereinafter claimed.

What is claimed is:
1. A wearable audiovisual translation system comprising:
an eyewear;
a camera system;
an audio device;
a mobile computing device;
a controller system;
the camera system and the controller system being detachably mounted onto the eyewear;
the camera system being electronically coupled to the controller system;
the controller system being communicably coupled to the mobile computing device;
the camera system being operably coupled to the mobile computing device through the controller system, wherein visual signals captured by the camera system are transmitted to the mobile computing device through the controller system; and
the audio device and the camera system being communicably coupled through the mobile computing device, wherein visual signals captured by the camera system are translated into audio signals by the mobile computing device and the audio signals are output through the audio device.

2. The wearable audiovisual translation system of claim 1, the controller system comprising:
a microcontroller, a wireless communication module, and a power source;
the microcontroller being electrically connected to the power source;
the wireless communication module being electronically coupled to the microcontroller; and
the wireless communication module being communicably coupled to the mobile computing device.

3. The wearable audiovisual translation system of claim 2, the controller system comprising:
a voltage regulator;
a plurality of wires;
the voltage regulator being electrically connected to the power source;
the voltage regulator being electronically connected to the microcontroller; and
the plurality of wires being electrically connected between the microcontroller, the power source, and the voltage regulator.

4. The wearable audiovisual translation system of claim 1, wherein the visual signals comprise at least one of hand signs, road signs, labels, and public displays.

5. The wearable audiovisual translation system of claim 1, wherein the audio device comprises at least one of ear-pods, headphones, and speakers.

6. The wearable audiovisual translation system of claim 1, comprising:
a human interface device (HID);
the HID being electronically connected to the controller system; and
the HID being operably coupled to the camera system, wherein operating the HID initiates the camera system to capture and transmit at least one image to the mobile computing device through the controller system.

7. The wearable audiovisual translation system of claim 6, wherein the HID is a push button.

8. The wearable audiovisual translation system of claim 1, wherein the camera system continuously captures and streams images into the mobile computing device at a predefined rate.

9. A wearable audiovisual translation system comprising:
an eyewear;
a camera system;
an audio device;
a mobile computing device;
a controller system;
at least one housing unit;
the controller system comprising a microcontroller, a wireless communication module, and a power source;
the camera system and the controller system being mounted onto the eyewear;
the housing unit being laterally mounted onto the eyewear;
the camera system being laterally integrated onto the housing unit, wherein the housing unit is mounted onto the bridge of the eyewear;
the controller system being mounted within the housing unit, wherein the housing unit is mounted onto a leg of the eyewear adjacent to a temple region;
the camera system being electronically coupled to the controller system;
the controller system being communicably coupled to the mobile computing device;
the microcontroller being electrically connected to the power source;
the wireless communication module being electronically coupled to the microcontroller;
the wireless communication module being communicably coupled to the mobile computing device;
the camera system being operably coupled to the mobile computing device through the controller system, wherein visual signals captured by the camera system are transmitted to the mobile computing device through the controller system; and
the audio device and the camera system being communicably coupled through the mobile computing device, wherein visual signals captured by the camera system are translated into audio signals by the mobile computing device and the audio signals are output through the audio device.

10. The wearable audiovisual translation system of claim 9, wherein the visual signals comprise at least one of hand signs, road signs, labels, and public displays.

11. The wearable audiovisual translation system of claim 9, wherein the audio device comprises at least one of ear-pods, headphones, and speakers.

12. The wearable audiovisual translation system of claim 9, comprising:
a human interface device (HID);
the HID being electronically connected to the controller system; and
the HID being operably coupled to the camera system, wherein operating the HID initiates the camera system to capture and transmit at least one image to the mobile computing device through the controller system.

13. The wearable audiovisual translation system of claim 9, wherein the camera system continuously captures and streams images into the mobile computing device at a predefined rate.

14. A wearable audiovisual translation system comprising:
an eyewear;
a camera system;
an audio device;
a mobile computing device;
a controller system;
the controller system comprising a microcontroller, a wireless communication module, a power source, a voltage regulator, and a plurality of wires;
the camera system and the controller system being mounted onto the eyewear;
the camera system being electronically coupled to the controller system;
the controller system being communicably coupled to the mobile computing device;
the microcontroller being electrically connected to the power source;
the wireless communication module being electronically coupled to the microcontroller;
the wireless communication module being communicably coupled to the mobile computing device;
the voltage regulator being electrically connected to the power source;
the voltage regulator being electronically connected to the microcontroller;
the plurality of wires being electrically connected between the microcontroller, the power source, and the voltage regulator;

the camera system being operably coupled to the mobile computing device through the controller system, wherein visual signals captured by the camera system are transmitted to the mobile computing device through the controller system; and the audio device and the camera system being communicably coupled through the mobile computing device, wherein visual signals captured by the camera system are translated into audio signals by the mobile computing device and the audio signals are output through the audio device.

\* \* \* \* \*